K. T. MACLIN.
SCRUBBING PAIL.
APPLICATION FILED DEC. 14, 1915.
1,219,017.
Patented Mar. 13, 1917.
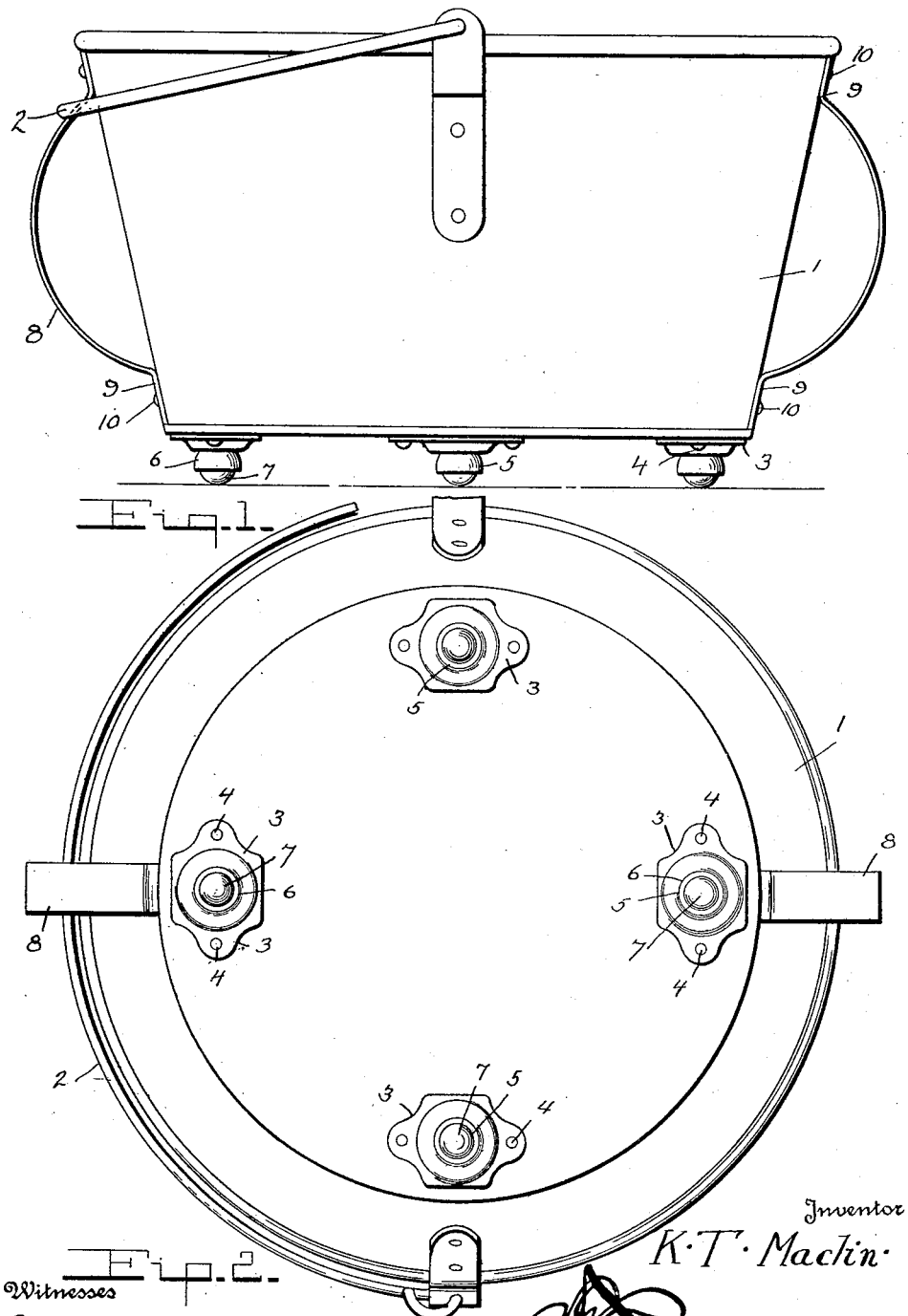

UNITED STATES PATENT OFFICE.

KATHERINE T. MACLIN, OF NORTH EMPORIA, VIRGINIA.

SCRUBBING-PAIL.

1,219,017. Specification of Letters Patent. Patented Mar. 13, 1917.

Application filed December 14, 1915. Serial No. 66,781.

*To all whom it may concern:*

Be it known that I, KATHERINE T. MACLIN, a citizen of the United States, residing at North Emporia, in the county of Greensville and State of Virginia, have invented certain new and useful Improvements in Scrubbing-Pails; and I do hereby declare the following to be a full, clear, and exact description of the invention, such as will enable others skilled in the art to which it appertains to make and use the same.

The primary object of this invention is to improve the construction of scrubbing pails, by providing a pail that can be conveniently moved over the floor, or other surface that is being scrubbed, when the operator is in a stooped position and without necessitating the lifting of the pail by the operator.

Another object of the invention is to provide a pail, for carrying out the above object, which will be of simple construction, will be durable and efficient in operation.

Other objects will appear and be better understood from that embodiment of my invention of which the following is a specification, reference being had to the accompanying drawing forming a part thereof, in which:

Figure 1 is a side elevation of the pail, and

Fig. 2 is a bottom plan view thereof.

Referring to the drawing in detail, the numeral 1 designates a scrubbing pail, which is provided with the usual carrying bail 2. The lower surface of the bottom wall of the pail 1 is provided with a plurality of spaced plates 3, which are arranged adjacent the outer edge of the lower wall of the receptacle or pail, and are secured thereto by means of the fastening elements 4. Each of the plates 3 are provided with substantially semispherical shaped sockets 5, which depend from the plates 3, and which receive spherical casters 7, portions of the casters 7 extending below the socket 5, as shown in Fig. 1, so as to admit of the pail being moved over the floor or other surface.

Arcuate shaped manipulating handles 8 are positioned, at diametrically opposite points, on the outer side of the pail, and each has its opposite ends flanged, as shown at 9, and is secured to the body of the pail by means of the fastening elements 10. The handles 8 admit of the operator conveniently moving the pail over the floor, or other surface, and, as shown in Fig. 1 of the drawing, the said handles 8 serve as stops for limiting the downward movement of the bail 2, when the latter is lowered to inoperative position, so as to hold the bail in spaced relation with the sides of the pail 1, whereby to facilitate the gripping of the bail 2 by the hand of the operator when it is desired to carry the pail, in the usual manner.

Either of the handles 8 may serve as a support for a floor cloth, not shown, by inserting the cloth within the handle, when not in use.

Having thus described my invention what I claim as new, is:

A receptacle of the class described adapted to have movement over a surface; a pair of arcuate shaped elements located at opposite points on the receptacle and each having a length approximately co-extensive with the height of the receptacle; and a bail pivotally mounted on the receptacle at the upper end thereof and adapted, when in inoperative position, to rest on either of the arcuate shaped elements.

In testimony whereof I affix my signature in presence of two witnesses.

KATHERINE T. MACLIN.

Witnesses:
ANNIE G. EDWARDS,
JENNIE KITCHIN.

Copies of this patent may be obtained for five cents each, by addressing the "Commissioner of Patents, Washington, D. C."